United States Patent [19]

Kamimura et al.

[11] Patent Number: 5,111,239
[45] Date of Patent: May 5, 1992

[54] CARD TRANSPORTING DEVICE FOR USE IN A READER PRINTER OR THE LIKE

[75] Inventors: Kuniaki Kamimura, Ebina; Kenji Sawada, Machida; Yasushi Yamade, Sagamihara, all of Japan

[73] Assignee: Minolta Camera Kabushiki Kaisha, Osaka, Japan

[21] Appl. No.: 693,365

[22] Filed: Apr. 30, 1991

[30] Foreign Application Priority Data

May 1, 1990 [JP] Japan ................................. 2-115993
May 1, 1990 [JP] Japan ................................. 2-115994
May 1, 1990 [JP] Japan ................................. 2-115995

[51] Int. Cl.⁵ ............................................. G03B 13/28
[52] U.S. Cl. ......................................... 355/45; 355/51
[58] Field of Search ....................... 355/41, 43, 45, 51; 271/69, 165, 256, 257

[56] References Cited

U.S. PATENT DOCUMENTS 3,597,076 8/1971 Hubbard et al. .................. 355/51 X
3,802,773 4/1974 Schneider ......................... 355/45 X
4,278,346 7/1981 Toriumi et al. ....................... 355/45
4,501,487 2/1985 McCormick-Goodhart .... 355/43 X

FOREIGN PATENT DOCUMENTS 60-218246 10/1985 Japan .

Primary Examiner—Richard A. Wintercorn
Attorney, Agent, or Firm—Price, Gess & Ubell

[57] ABSTRACT

The disclosure relates to a card transporting device for use in a reader printer or the like. The card transporting device is capable of first transporting for transporting to a projecting position in the reader printer one after another a plurality of aperture cards accommodated in an accommodating portion of the card transporting device, second transporting for transporting one aperture card inserted into the card transport device through an insertion portion thereof, discharging the projected aperture card to either first or second discharge portions provided in the card transporting device, and third transporting for transporting to the projecting position the aperture card discharged in the first and second discharge portions.

7 Claims, 16 Drawing Sheets

CARD TRANSPORTING DEVICE FOR USE IN A READER PRINTER OR THE LIKE

BACKGROUND OF THE INVENTION

1. Field of the Invention

The present invention relates to a card transporting device for use in an apparatus capable of projecting a microfilm image on an aperture card or printing said microfilm image as required.

2. Description of the Related Art

An aperture card comprises a hole opening on a rectangular mount, said hole having one or more microfilms adhered thereto. A reader-printer can project and/or print a screen image of the microfilm image on the aforesaid aperture card.

Accordingly, a reader-printer transports and supplies aperture cards loaded in a card stocker to a projection position by means of a card transporting device. After projection, the projected aperture card is discharged to a discharge tray.

FIG. 1 is a section view showing the essential construction of the aforesaid reader-printer.

Reader-printer 1 comprises a projection unit 2 having a light source and lens assembly, an aperture card stocker unit 3, a card transporting device 4 for supplying aperture cards from the card stocker 3 to the projection unit 2 and for discharging the aperture card to a discharge tray, a reader device for projecting the projected aperture card microfilm image onto a screen, and a printer device for reproducing the aforesaid microfilm image.

The projection unit 2 is provided with a pair of glass press plates 8 arranged immediately below the card stocker unit 3, a light source 9 and condenser lens 10 and projection lens 11 arranged linearly so that the pair of press plates 8 are interposed between said projection lens 11 and the condenser lens 10 and light source 9.

The card stocker unit 3 is capable of loading a plurality of aperture cards. The plurality of aperture cards are sequentially supplied one at a time to the projection position between the pair of glass press plates 8 by means of a card transporting device 4.

The reader unit 6 is provided with an oscillatable reader mirror 12 opposite the projection lens 11 and a stationary mirror 13. On the other hand, the printer unit 7 comprises a printer incorporating printer mirrors 14 and 15 and a photosensitive drum 16.

In the drawing, the solid lines describe the reader optical path, while the dashed lines describe the printer optical path.

FIG. 2 is a side elevation view showing the construction of the aforesaid card stocker unit 3 and the card transporting device 4.

The card stocker unit 3 is provided with a base plate 22 upon which are stacked a plurality of aperture cards ap, an output roller 23 and a presser plate 24 respectively disposed at the front and back of the aperture card ap, and a lever 25 and spring 26 for applying force on the presser plate 24 toward roller 23.

The card transporting device 4 comprises an output roller 23 that is rotatable in the arrow direction via a motor, a transport roller 27 disposed downstream from roller 23 in the card transport direction, a reversing roller 28 disposed opposite transport roller 27, a driven roller 29 disposed downstream of the pair of roller 27 and 28 in the card transport direction, a transport roller 30 disposed opposite the driven roller 29, a driven roller 31 downstream from the roller 30 in the card transport direction, and a transport roller 33 mounted to one end of an oscillating arm 32 so as to face the driven roller 30. The transport path 34 for the aperture cards ap is formed so as to lay between the aforesaid rollers 27 and 28, rollers 29 and 30, and rollers 31 and 33.

Beneath the aforesaid transport path 34 is positioned the top opening of the glass press plates 8 for holding the aperture cards in the previously described projection unit 2. Further, a base plate 35 is disposed at the bottom of the pair of glass press plates 8.

When the aperture card ap that has been loaded into the card stocker unit 3 is transported to the projection position of the projection unit 2, each of the rollers 23, 27, 28 and 30 are rotated in the direction indicated by the arrows in the drawing by means of pressing a button on the operation portion, and the aperture cards ap are output one at a time to the transport path 34.

When an aperture card ap is inserted between the glass press plates 8, said insertion is detected by a sensor and the drive rotation applied to roller 23 is stopped.

However, in the aforesaid type of conventional reader-printer a card transporting device must be provided to sequentially transport one card at a time from a plurality of aperture cards loaded in the card stocker unit to the exposure portion. Therefore, the operation of the apparatus is extremely inconvenient when aperture cards are sequentially supplied from the card stocker unit but a single aperture card which has not been loaded into the card stocker is desired as the next card while the projection process is underway.

In other words, the card transporting process first must be stopped, and all the aperture cards loaded in the card stocker removed. Then, the aperture card desired for projection must be loaded in the card stocker, the start button on the operation portion must be pushed and the aforesaid aperture card must be transported to the projection portion.

FIG. 3 is a top plan view showing a part of the transport path to the discharge tray of the previously described card transporting device.

In the drawing, the pair of glass press plates 8 that form the projection position are arranged horizontally in the extended transport path 22. The transport path 22 is provided with a discharge tray 23 at the right end in the drawing. Item 24 is a guide member for the discharge tray 23.

The entrance port of the discharge tray 23 is provided with a discharge roller 32 and a driven roller 32A disposed opposite said roller 32.

Further, the glass pressure plate 8 on one side is mounted so as to be capable of approaching and receding from the other glass press plate 8 by means of a solenoid 34.

The left end of the transport path 22 is provided with a stopper 26, and the center portion of the transport path 22 is provided with a transport roller 31. The driven roller 31A disposed opposite the transport roller 31 is brought into contact with and retracted from said transport roller 31 by means of an arm 35 and solenoid 34. A photoemitter element 37A and photoreceptor element 37B disposed opposite said photoemitter element 37A are arranged in the transport path 22 between the aforesaid transport roller 31 and the discharge roller 32.

The aperture card ap1 supplied from the card stocker unit 3 is transported to the exposure position by means of the counterclockwise rotation of the transport roller 31 (ap2). The aperture card ap2 is discharged by the clockwise rotation of the transport roller 31 and stacked (ap3) in the discharge tray 23 via the clockwise rotation of the discharge roller 32.

In the previously described conventional reader-printer, only the aperture card that has been projected in the projection portion is discharged to the discharge tray by the card discharge device. Therefore, when the operator wants to again project an aperture card which has already been projected once, the operator must remove the aperture card from the discharge tray and load said card in the card stocker unit, such that the handling is unsuitable for a reader-printer. For example, when checking the film images (drawings, for instance) of sequentially projected several aperture cards, the operator may be inconvenienced inasmuch as the transport speed of the aperture cards from supply to discharge is too slow.

Further, the previously described conventional reader-printer is constructed such that an aperture card that has been projected in the projection portion is discharged to a single discharge tray by means of only one card discharge device. Therefore, it is not possible for the operator to sort the successively projected aperture cards by content (type of drawing or the like) or processing method (print size classification or the like), even when such sorting is desired.

SUMMARY OF THE INVENTION

A main object of the present invention is to provide a device having at least a microfilm reader portion capable of simply and efficiently examining microfilm images.

A further object of the present invention is to provide a device having at least a microfilm reader portion capable of simply examining aperture cards having microfilm, sorting said aperture cards, re-examining said aperture cards, and interrupting the examination of said aperture cards.

These and other objects of the present invention are accomplished by providing a device having at least a microfilm reader unit having
- a card stocker unit for loading a plurality of aperture cards;
- a first card transporting means for supplying the aperture cards loaded in the card stocker unit one by one to a card projecting portion;
- a card inserting portion for inserting a single aperture card;
- a second card transporting means for supplying an aperture card inserted in the card inserting portion to the card projecting portion;
- a first and second card accommodating portions for accommodating aperture cards transported from the card projecting portion;
- a third card transporting means for transporting aperture cards between the card projecting portion and the first card accommodating portion; and
- a fourth card transporting means for transporting aperture cards between the card projecting portion and the second card accommodating portion.

These and other objects, advantages and features of the invention will become apparent from the following description thereof take in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Figure 1:
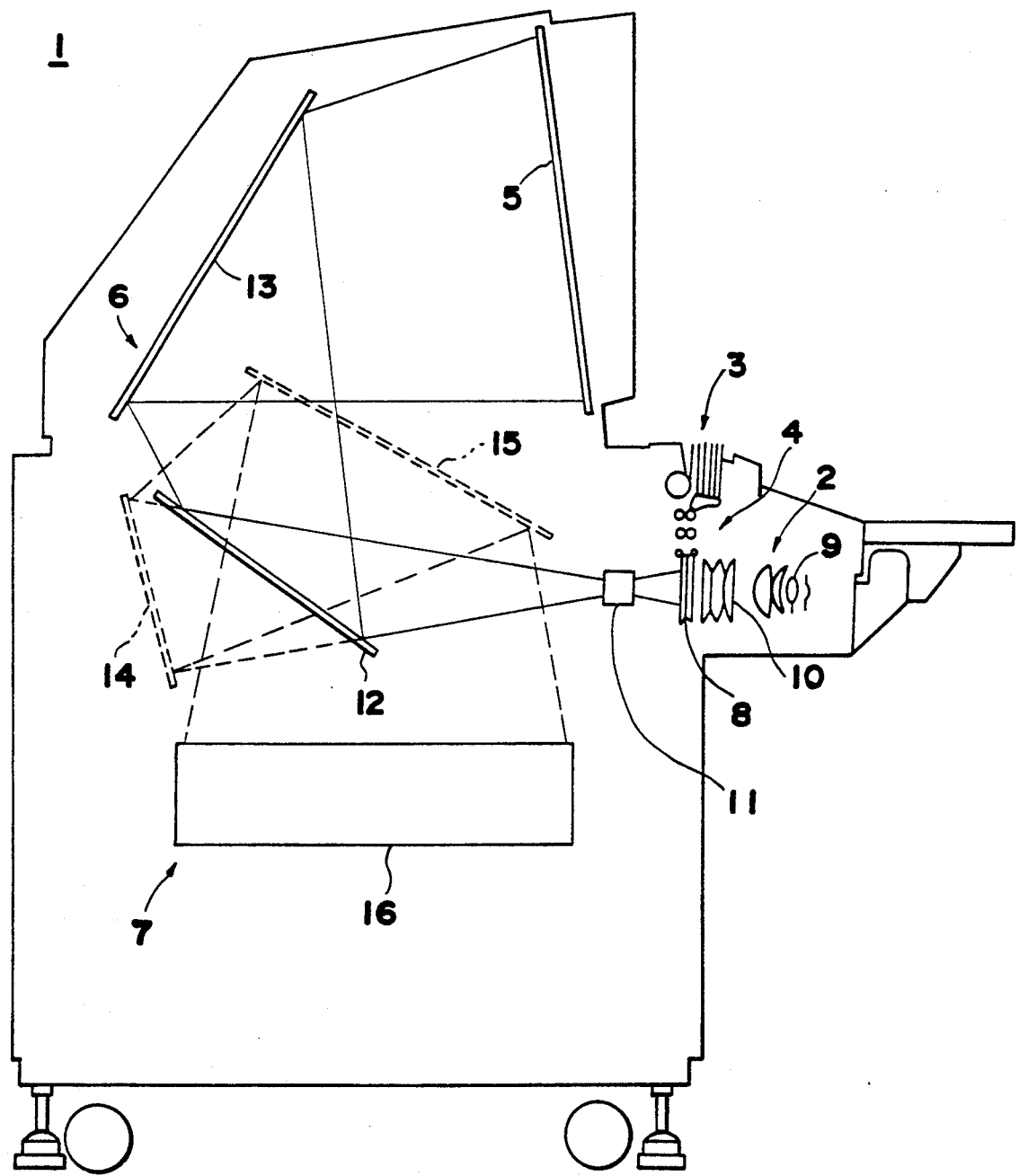
FIG. 1 is a side elevation view showing the essential construction of a conventional reader-printer.
Figure 2:
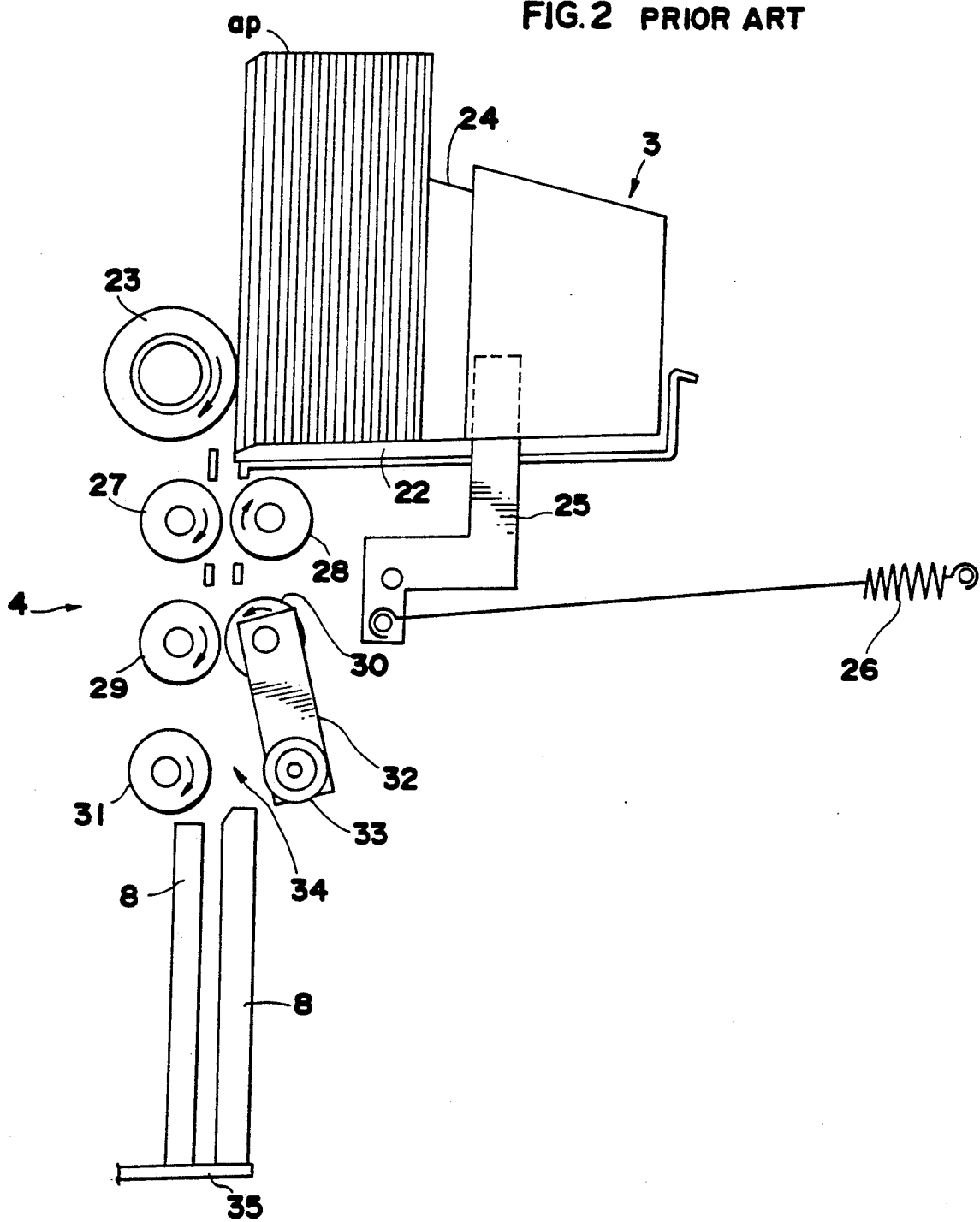
FIG. 2 is an illustration briefly showing the construction of the card transporting device of a conventional reader-printer.
Figure 3:
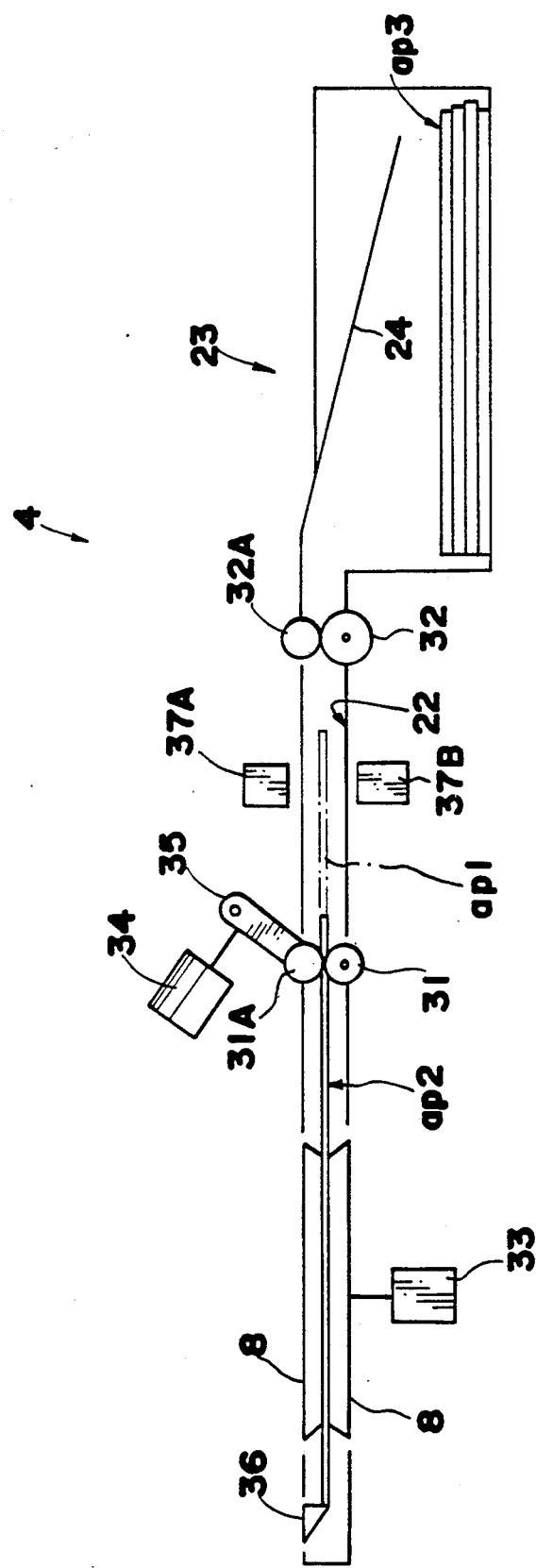
FIG. 3 is a top plan view showing the portion of the card transport path from the card transport device to the discharge tray in a conventional reader-printer.
Figure 4:
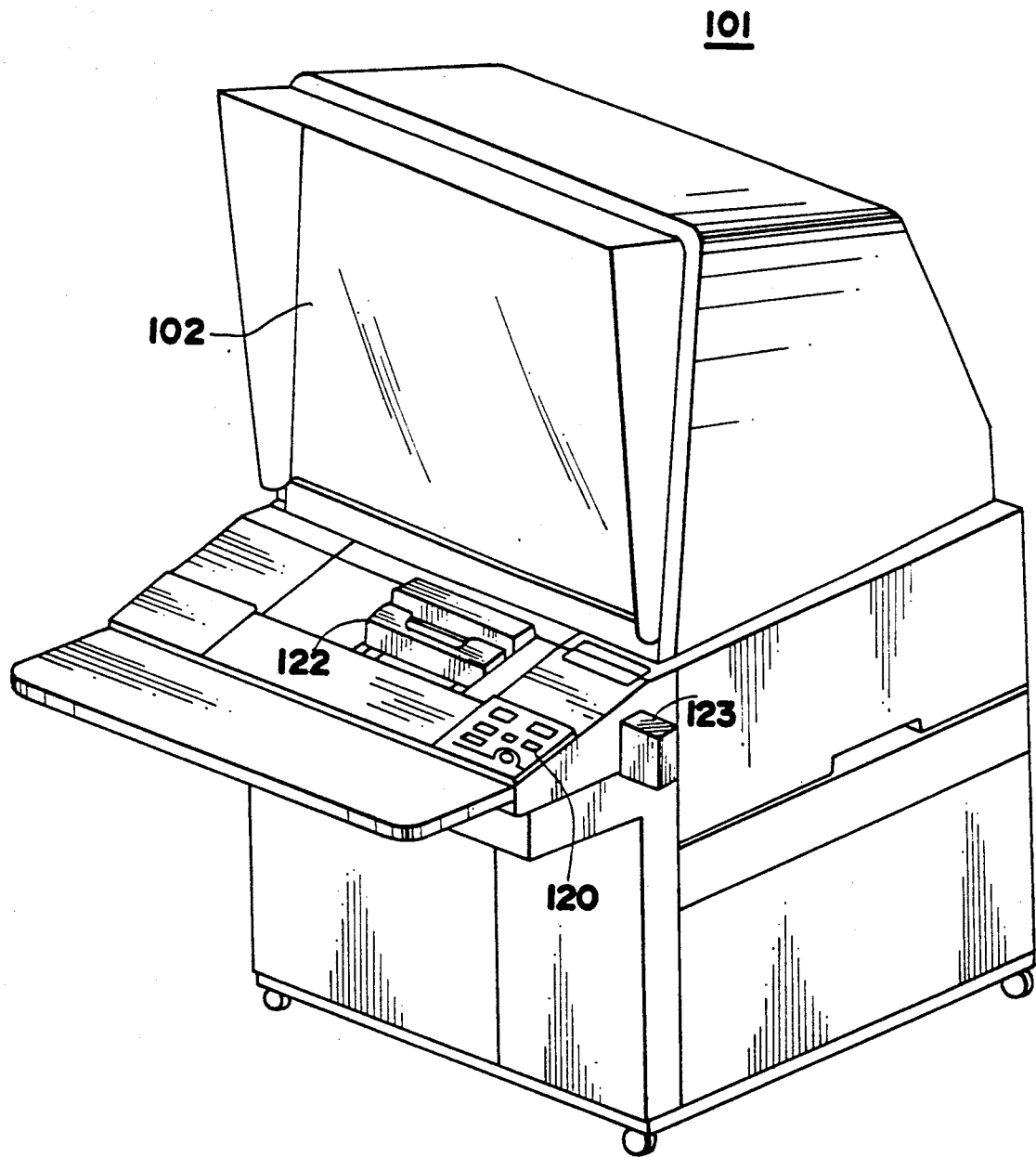
FIG. 4 is a perspective view showing an exterior view of an embodiment of the reader-printer of the present invention.

FIG. 4 shows an exterior view of a reader-printer 101. The reader-printer 101 projects an enlargement of the aperture card microfilm image onto a screen 102, and is capable of printing said microfilm image.

Figure 5:
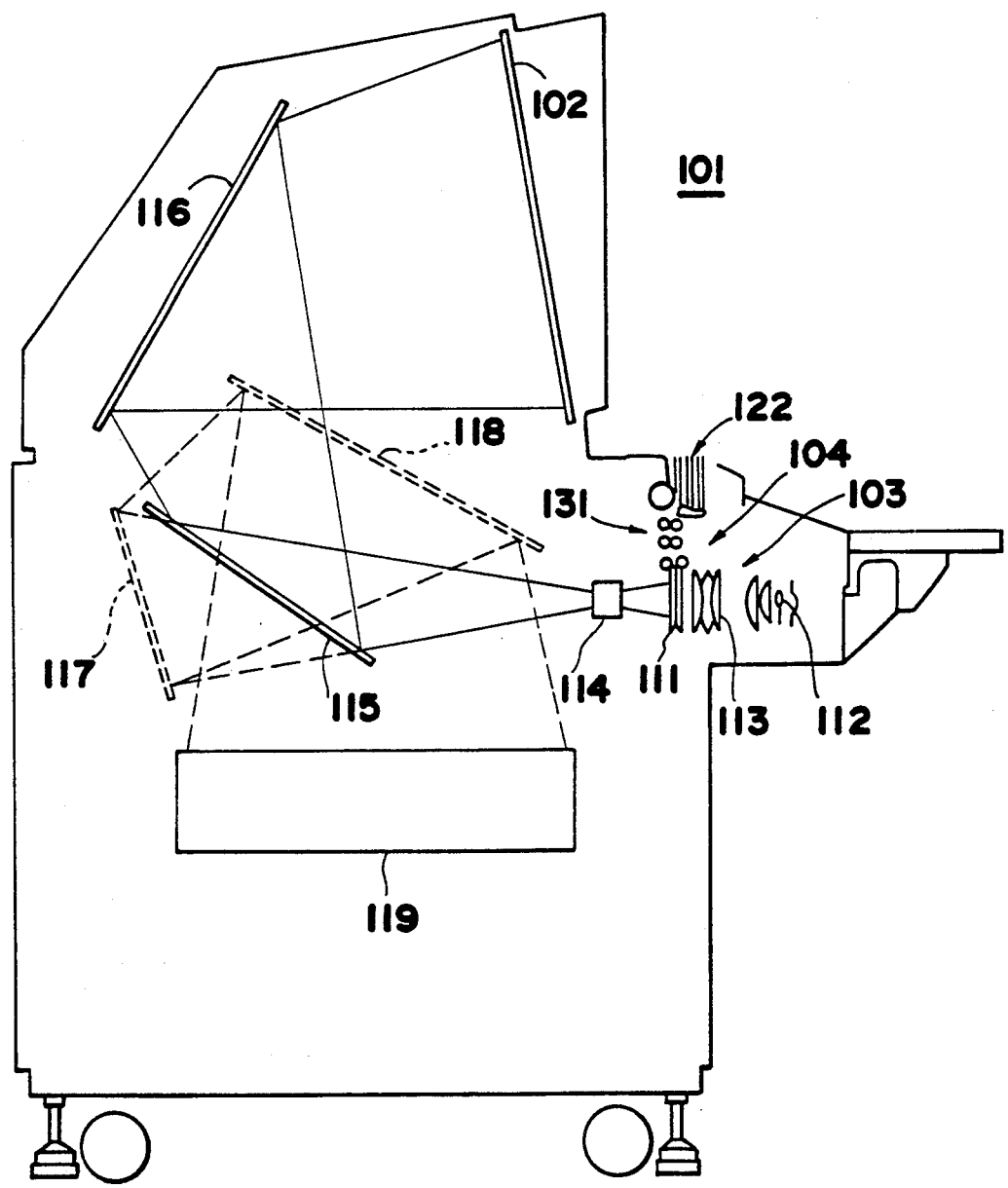
FIG. 5 is a perspective view showing the essential interior construction of an embodiment of the reader-printer of the present invention.

The reader-printer 101 comprises a microfilm image projection unit 103, a card transporting unit 104 for transporting the aperture cards to the projection unit, and control units for the respective projection unit and transporting unit, as shown in FIG. 5.

The projection unit 103 comprises a carrier formed by a pair of glass plates 111, a light source 112 for irradiating the aforesaid carrier with light, a condenser lens 113 formed by a plurality of lenses interposed between the aforesaid light source 112 and the carrier, and a projection lens 114 for projecting the microfilm image of the aperture card supported by the carrier.

A rotatable reader mirror 115 is provided opposite the projection lens 114. A stationary mirror 116 is provided opposite the aforesaid screen 102, such that the projection light is reflected from the reader mirror 115 and onto the screen 102 via said stationary mirror 116.

A print mirror 117 is provided adjacent to the reader mirror 115, and opposite said print mirror 117 is mounted a stationary mirror 118. Item 119 is a photosensitive drum. Although not shown in the drawing, various printer devices such as an exposure slit and the like are disposed on the periphery of the photosensitive drum 119.

Figure 8:
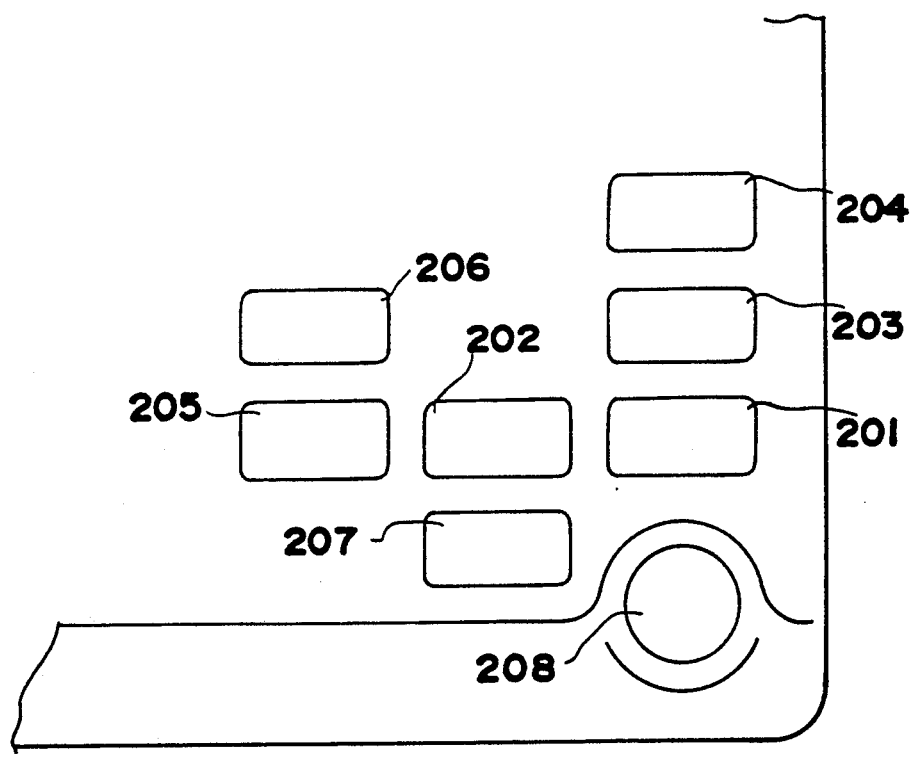
FIG. 8 is a top plan view showing a part of the operation panel of an embodiment of the reader-printer of the present invention.

As shown in FIG. 4, the operation panel 120 disposed in front of the screen 102 is provided with an array of various selection buttons (refer to FIG. 8). The reader-printer 101 can specify either the reader operation or the printer operation by operating the selection buttons on the operation panel.

After the aperture card is interposed between and supported by the two glass plates 111, the reader operation entails enlarging and projecting the aperture card microfilm image via the light source 112 and the projection lens 114 such that said microfilm image is projected onto the screen 102 by means of the reader mirror 115 and the stationary mirror 116.

The printer operation entails retracting the mirror 115 from the optical path, and the microfilm image of the aperture card interposed between and supported by the two glass plates 111 is exposed onto the photosensitive drum 119 via the printing mirror 117 and mirror 118, and said microfilm image is printed on a recording sheet by means of a well known process. In FIG. 5, the solid lines indicate the optical path during the reader operation, and the dashed lines indicate the optical path during the printer operation.

The reader-printer 101 is also provided with a manual card unit 121 (refer to FIG. 7) wherein a single aperture card can be inserted manually by the operator, said manual card unit 121 being disposed at one side of the reader-printer 101 and the card stocker unit 122 capable of loading a plurality of aperture cards being disposed at the front of the screen 102.

As shown in FIG. 5, the card transporting unit 104 transports the aperture cards from the manual card unit 121 and the card stocker unit 122 to the projection unit 103.

Figure 7:
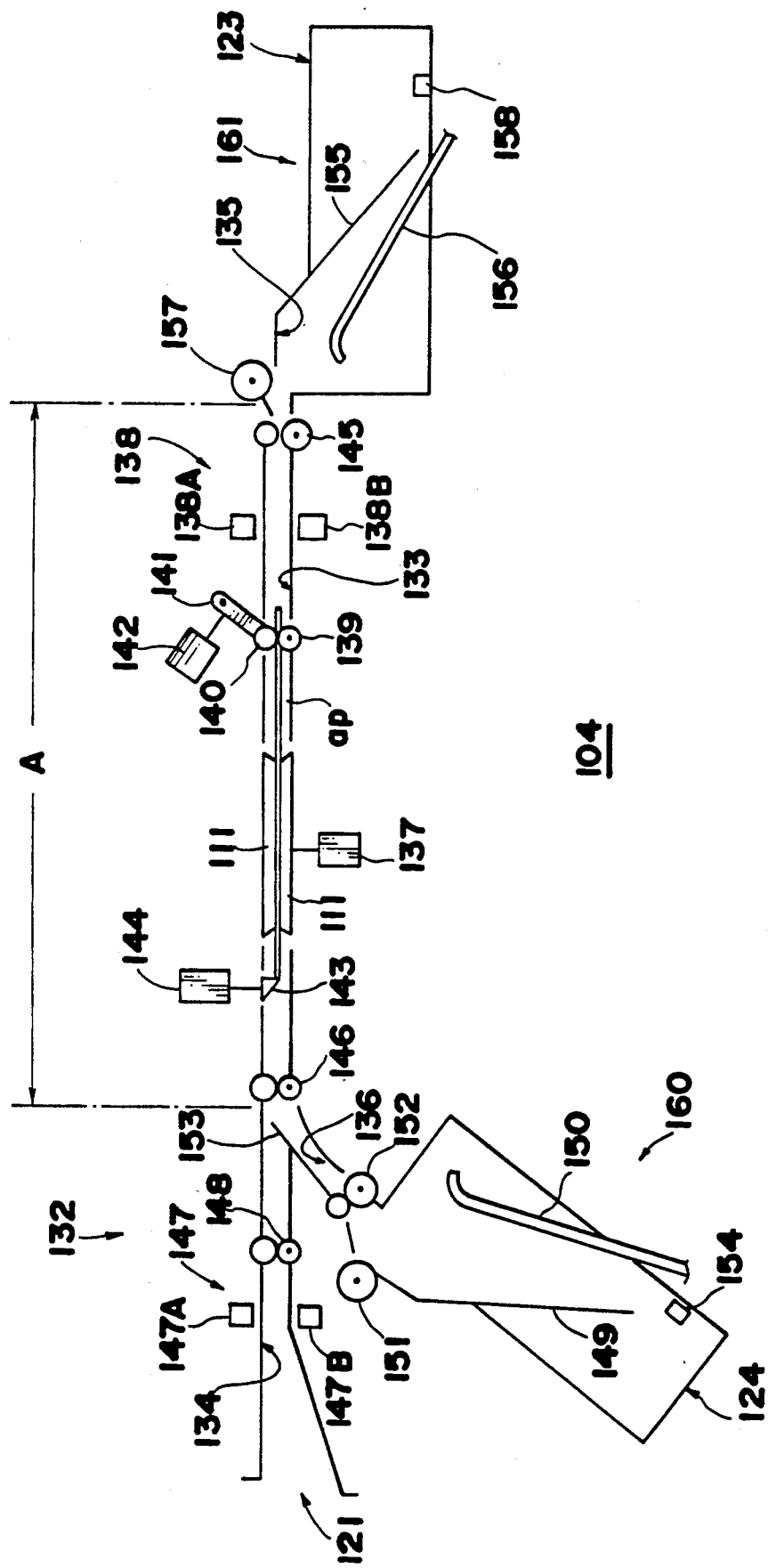
FIG. 7 is a top plan view showing the essential construction of the card transporting device in an embodiment of the reader-printer of the present invention.

The reader-printer 101 is provided with a right tray (discharge tray) 123 accommodating aperture cards that have already been projected, and a left tray (reserve tray) 124 accommodating aperture cards that have been sorted during projection (refer to FIG. 7).

The control unit for controlling the operation of the reader-printer 101 has a control circuit not shown in the drawing, and operation instructions are input to the control circuit via the operation panel 120. The control circuit, as is common knowledge, comprises a central processing unit (CPU), random access memory (RAM), read only memory (ROM) and the like. The control circuit is linked to each device in the reader-printer, for example, the printer, the card transporting unit and the like.

The construction of the card transporting device is described hereinafter with reference to FIGS. 6 and 7.

The card transporting device 104 has a first card transporting means 131 for transporting the aperture card ap downwardly from the card stocker unit 122 so as to supply the aperture card ap to the carrier, a second card transporting means 132 for transporting the aperture card ap horizontally from the manual card unit 121 so as to supply said aperture card ap to the carrier, a third card transporting means 160 for transporting the aperture card ap either to the carrier from the reserve tray 124 or to the reserve tray 124 from the carrier, and a fourth card transporting means 161 for transporting the aperture card ap either to the carrier from the discharge tray 123 or to the discharge tray 123 from the carrier.

The first card transporting means 131 sequentially transports the plurality of aperture cards ap loaded into the card stocker unit 122 one card at a time to the carrier (pair of glass plates 111).

Figure 6:
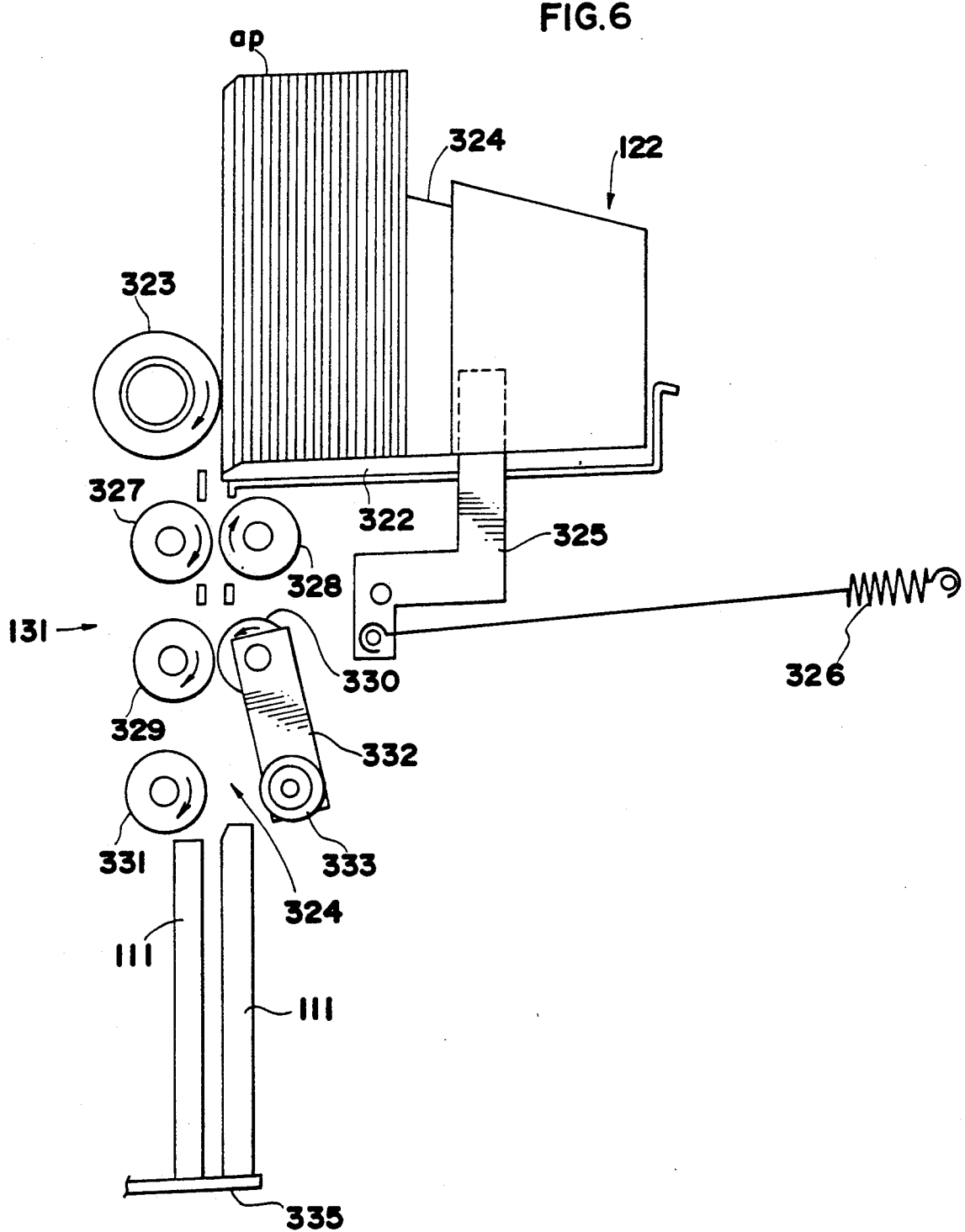
FIG. 6 is a perspective view in section showing the card stocker unit and the first card transporting means in the reader-printer shown in FIG. 5.

The construction of the first card transporting device 131 is shown in FIG. 6.

The card stocker unit 122 has a base plate 322 upon which are stacked a plurality of aperture cards ap, and a feed roller 323 and a presser plate 324 arranged respectively at the front and back sides of the aforesaid aperture cards ap. The presser plate 324 normally applies force toward the feed roller 323 via a lever 325. The aforesaid lever 325 normally applies the aforesaid force by means of a spring 326 such that the aperture cards ap are brought into contact with the feed roller 323 by a uniform force.

The first card transporting means 131 has a feed roller 323 that is rotatably driven by a motor in the direction indicated by the arrow in the drawing. The previously mentioned pair of glass plates 111 are disposed on the downstream side of the feed roller 323 in the card transport direction. A transport path 334 is formed by the rollers described below for transporting the aperture card ap from the feed roller 323 and delivering said card ap to the slit formed by the pair of glass plates 111 that form the projection portion.

A drive roller 327 and a counter-rotating roller 328 are provided so as to confront one another on the downstream side of the transport roller 323 in the card transport direction. The aperture cards ap are fed one card at a time by the counter-rotating roller 328. A driven roller 329 and a transport roller 330 supported by one end of the oscillating arm 332 opposite the roller 329 are provided on the downstream side of the aforesaid rollers 327 and 328 in the card transport direction. Further downstream from the aforesaid rollers 329 and 330 in the card transport direction are opposingly disposed a driven roller 331 and a transport roller 333 supported by the other end of the oscillating arm 332.

The first card transporting means for transporting the aperture card ap to the carrier from the card stocker unit comprises the aforesaid rollers 323, 327, 328, 329, 330, 331 and 333.

Item 335 is a base plate provided at the bottom surface of the glass plates 111. The aperture card ap is delivered to the top surface of the aforesaid base plate 335.

The card stocker unit 122 is provided with a sensor C1 (card empty sensor) for detecting the presence of the aperture card ap (sensor not shown in the drawing).

FIG. 7 shows the main transport path 133 (region A in the drawing) extending horizontally, a manual transport path 134, discharge tray path 135, and reserve tray path 136.

Within the main transport path 133 are opposingly disposed the previously described two glass plates 111 arranged so as to extend along the main transport path 133. The aperture card ap transported from the card stocker unit 122 is delivered between the aforesaid glass plates 111 (carrier).

One of the glass plates 111 is fixedly mounted so as to be stationary, while the other glass plates 111 are mounted so as to be capable of approaching toward and retracting from the stationary glass plate by means of a solenoid 137.

Also in the main transport path 133 is provided a sensor 138 for detecting whether or not an aperture card ap has been fed from the card stocker unit 122 to the main transport path 133. An arrangement of, for example, a photoemitter diode 138A and a photoreceptor diode 138B opposingly disposed across the main transport path 133 may be used as the aforesaid sensor 138.

The transport roller 139 is provided in the main transport path 133 and driven by a motor. After an aperture card ap is fed into the main transport path 133, the transport roller 139 delivers the aperture card ap to a specific position between the glass plates 111. A driven roller 140 is also provided opposite the aforesaid transport roller 139. The driven roller 140 is supported by one end of the oscillating arm 141. The solenoid 142 connected to the other end of the oscillating arm 141 is capable of causing the oscillating arm 141 to oscillate.

A card stopper 143 is provided in the main transport path 133 on the opposite side of the glass plates 111 relative to the transport roller 139. The card stopper 143 can be interposed into the main transport path 133 by means of a solenoid 144. The card stopper 143 is inserted into the main transport path 133 and makes contact with the tip of the aperture card ap transported between the two glass plates 111. The aforesaid interposition of the card stopper 143 into the main transport path 133 stops the aperture card ap at a specified projection position (position shown in FIG. 7). The microfilm image can be precisely projected as an enlarged image onto the screen 102 by means of the precise positioning of the aperture card ap using the card stopper 143.

At one end of the main transport path 133 is provided a transport roller 145 that is capable of transporting the aperture card ap from the projection position and discharging said aperture card ap to a discharge tray 123. At the other end of the main transport path 133 is provided a transport roller 146 that is capable of transporting an aperture card ap from the projection position and discharging said aperture card ap to a reserve tray 124. The aforesaid transporting rollers 145 and 146 are each provided and make contact with an opposing driven roller so as to encompass the main transport path 133.

The manual feed path 134 provided for the card manual feed portion 121 is arranged at one end of the main transport path 133 and is connected to said main transport path 133 through transport roller 146.

Near the opening of the card manual feed portion 121 is provided a sensor 147 for detecting whether or not the operator has inserted an aperture card ap into the manual feed portion 121. An arrangement of, for example, a photoemitter diode 147A and a photoreceptor diode 147B opposingly disposed so as to encompass the card manual feed path 134 may be used as the aforesaid sensor 147. A manually fed aperture card ap detected by the aforesaid sensor 147 can be automatically transported to the manual feed path 134 and the main transport path 133. The card manual feed portion 121 may also be positioned at some other location.

A transport roller 148 and an opposing driven roller are provided between the aforesaid sensor 147 and the transport roller 146.

The second card transporting means for transporting the aperture card ap to the carrier from the card manual feed portion 121 comprises the aforesaid rollers transport rollers 146 and 148.

The aperture card ap can be delivered to the main transport path 133 and discharged from the main transport path 133 through the reserve tray path 136 provided for the reserve tray 124. The reserve tray 124 has a guide member 149, a lift-up member 150, and a pickup roller 151 (with internal clutch).

Interposed between the reserve tray 124 and the reserve tray path 136 are a transport roller 152 and an opposing driven roller. In the communicating portion between the reserve tray path 136 and the main transport path 133 is provided a guide member 153 comprising, for example, a flat spring. The guide member 153 guides the aperture card ap from the m in transport path 133 to the reserve tray path 136 (not to the manual feed path 134). That is, the guide member 153 prevents the aperture card ap from entering the manual feed path 134 from the main transport path 133, and can prevent card jams.

A sensor 154 for detecting the presence of an aperture card ap in the reserve tray 124 is provided near the lift-up member 150.

The third card transporting means for transporting the aperture card ap between the carrier and the reserve tray 124 comprises the aforesaid lift-up member 150, pickup roller 151, guide member 149 and transport rollers 152 and 146.

A guide member 155 for guiding the aperture card ap into the discharge tray 123 is provided in the discharge tray path 135 connected to the aforesaid discharge tray 123 and the main transport path 133. The card jams are prevented by the aforesaid guide member 155. One end of the lift-up member 156 is oscillated by a drive means not shown in the drawings, such that an aperture card ap comes into contact with the pickup roller (with internal clutch) 157. The sensor 158 detects the presence of an aperture card ap within the right tray near the lift-up member 156. The pickup roller 157 either delivers the aperture card ap from the main transport path 133 to the discharge tray path 135, or delivers the aperture card ap from the discharge tray path 135 to the main transport path 133.

The fourth card transporting means for transporting the aperture card ap between the carrier and the discharge tray 123 comprises the aforesaid lift-up member 156, pickup roller 157, guide member 155, and transport rollers 145 and 139.

FIG. 8 shows the selection keys on the operation panel 120. The various operations of the reader-printer 101 can be selected by selecting the aforesaid selection keys.

Item 201 is a first transport mode key for transporting a single aperture card ap from the card stocker unit 122 to the carrier, and from the carrier to the discharge tray 123. Item 202 is a second transport mode key for transporting a single aperture card ap from the reserve tray 124 to the carrier, and to the discharge tray 123. Item 203 is a third transport mode key for automatic continuous transporting of aperture cards ap from the card stocker unit 122 to the carrier without printing the projection image of the aperture cards ap. Item 204 is a fourth transport mode key for automatic continuous transporting of the aperture cards ap from the card stocker unit 122 to the carrier while simultaneously printing the projection image of said aperture cards ap. Item 205 is a fifth transport mode key for transporting, one card at a time, the aperture cards ap accommodated within the discharge tray 123 to the carrier. Item 206 is a sixth transport mode key for transporting an aperture card ap held between the two glass plates 111 to the reserve tray 124. Item 207 is a stop key, and item 208 is a start key.

The relationships between the detection means (sensors, selection keys and the like) and the drive means (rollers, solenoids and the like) controlled by the CPU are described hereinafter with reference to FIG. 9.

Figure 9:
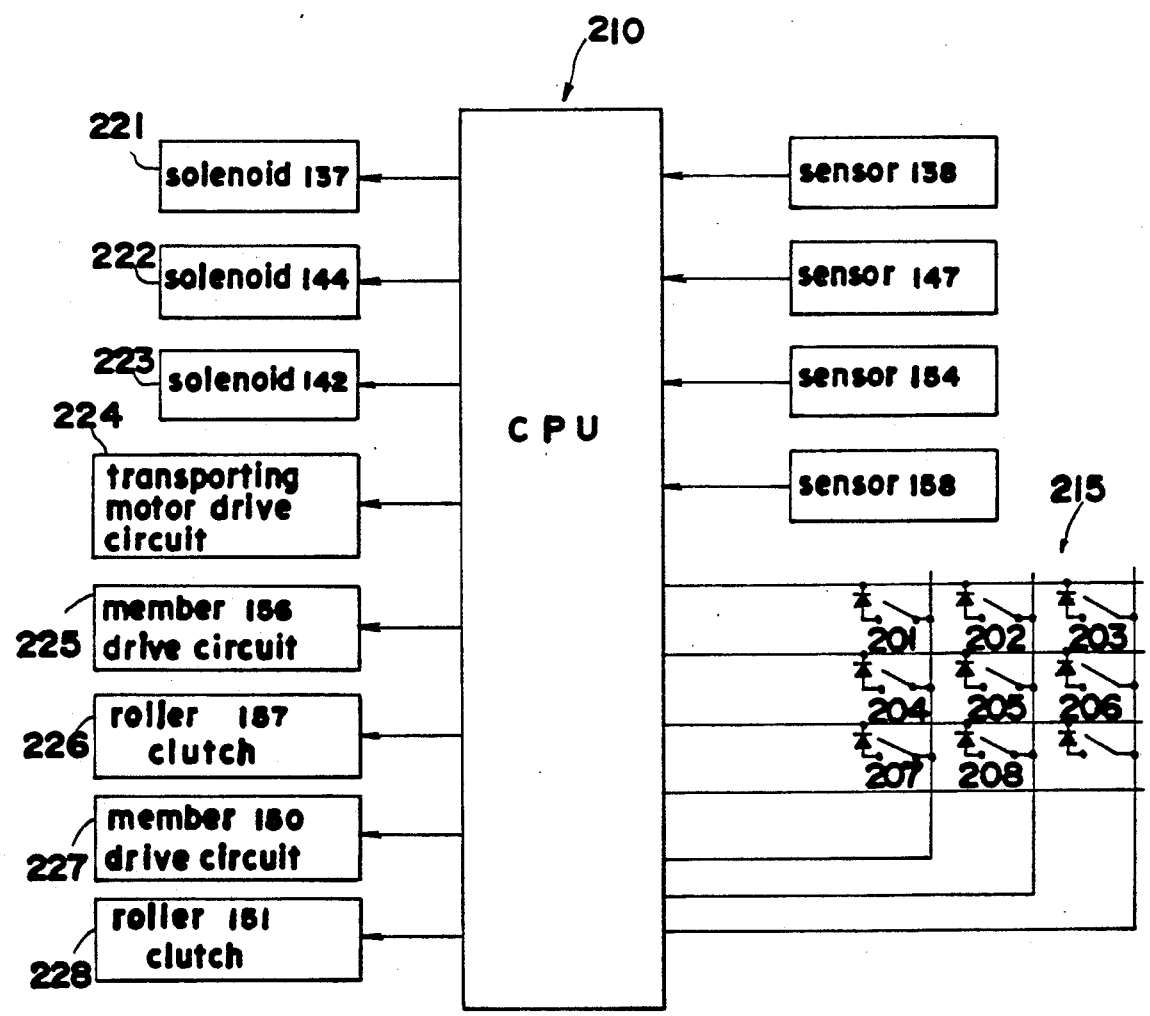
FIG. 9 is a block diagram illustrating the relationship between the drive means and the detecting means controlled by the central processing unit (CPU) built into the embodiment of the reader-printer of the present invention.

The item 210 in FIG. 9 is the CPU. The CPU 210 is connected to the sensors 138, 147, 154 and 158, the operation panel selection key circuit 215, solenoid drive circuits 221, 222 and 223, transport rollers drive circuit 224, and drive circuits 225 through 228 for the pickup rollers and the lift-up members for the discharge tray 123 and the reserve tray 124.

Accordingly, the CPU 210 receives various detection signals from the various sensors 138, 147, 154 and 158, as well as the detection signals from the selection keys 201 through 208, and based on the aforesaid detection signals, individually controls and actuates the solenoids 137, 144 and 142, the transport rollers 323, 139, 145, 146, 148, 152 and the like, the lift-up members 150 and 156, and the pickup rollers 151 and 157.

The operational sequence of the card transporting device 104 of the reader-printer is described hereinafter with reference to FIGS. 10 through 16.

Figure 10:
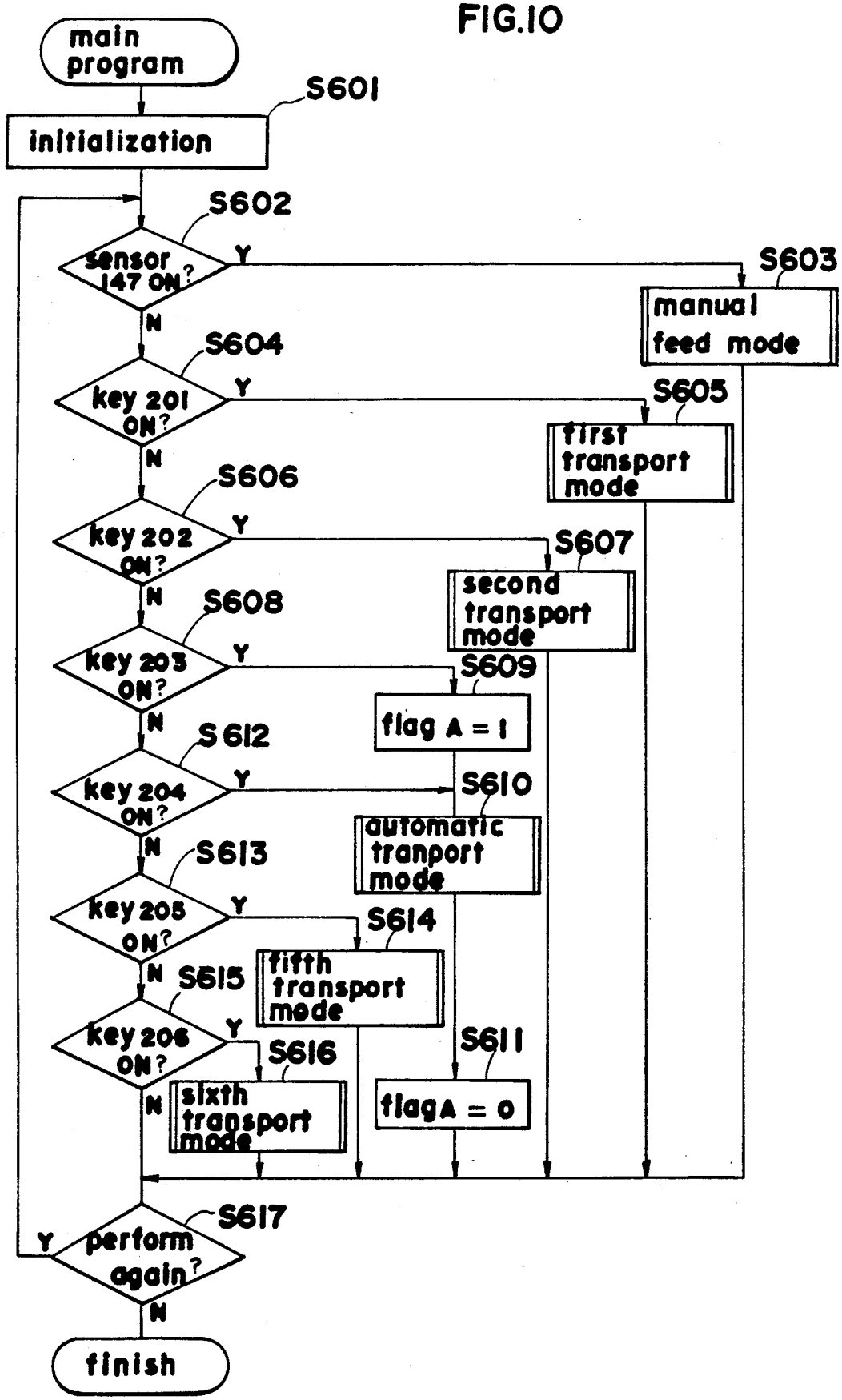
FIGS. 10 through 16 are flow charts showing the operation sequence of the embodiment of the reader-printer of the present invention.

FIG. 10 is a flow chart briefly showing the operation sequence of the card transporting device 104 of an embodiment of the present invention.

First, CPU 210 initializes the drive circuits and detection devices and the like (step S601). Then, a check is made to determine whether or not the sensor 147 is ON, i.e., whether or not an aperture card ap has been inserted into the card manual feed portion 121 by the operator (step 602).

When the insertion of an aperture card ap by the operator is detected (reply to query in step 602 is YES), the manual transport mode routine is executed in step 603.

Thereafter, a check is made in step 617 to determine whether or not to re-execute the program.

When re-executing the program (answer to the query in step S617 is YES), the routine returns to step S601. On the other hand, when the program is not re-executed (reply to query in step S617 is NO), the main program is completed.

When the insertion of an aperture card ap is not detected via the results of the check run in step S602 (reply to query in step S602 is NO), a check is made in step S604 to determine whether or not the first transport mode key 201 on the operation panel has been depressed.

When the first transport mode key 201 has been depressed, the first transport mode subroutine is executed in step S605, and the program continues to step S617. In the first transport mode subroutine, a single aperture card ap is transported from the card stocker unit 122 to the discharge tray 123 through the carrier to allow card retrieval.

Then, if the first transport mode key 201 has not been pressed (reply to query in step S604 is NO), a check is run in step S606 to determine whether or not the second transport mode key 202 has been depressed. If the key 202 has been depressed, the second transport mode subroutine is executed in step S607, and then the program continues to step S617. A single aperture card ap is transported from the reserve tray 124 to the carrier when the aforesaid key 202 is pressed.

When the second transport mode key 202 has not been pressed, the program continues to the next step S608. In step S608 a check is made to determine whether or not the third transport mode key 203 has been pressed. When the third transport mode key 203 has been pressed, the print flag A is set to [1] in step S609, the automatic transport mode subroutine is executed, then in step S611 the print flag A is reset to [0], and the program continues to step S617. When the print flag A is set to [1] the aperture card microfilm image is not printed, but when the print flag A is set to [0] the microfilm image is printed.

When the third transport mode key 203 is pressed, the aperture cards ap are automatically and continuously transported from the card stocker unit 122 to the carrier and reader operation alone is executed without printing the images. The third transport mode can be executed to allow continuous scanning of numerous aperture cards ap.

If the third transport mode key 203 has not been pressed, a check is made in step S612 to determine whether or not the fourth transport mode key 204 has been pressed. If the fourth transport mode key 204 has been pressed, the automatic transport subroutine is executed in step S610, and thereafter the print flag A is reset to [0] in step S611, and the program continues to step S617. When the fourth transport mode key 204 has been pressed, the fourth transport mode is executed wherein the aperture cards ap are automatically transported for the reader operation and the printing operation.

If the fourth transport mode key 204 has not been pressed, a check is made in step S613 to determine whether or not the fifth transport mode key 205 has been pressed. If the fifth transport mode key 205 has been pressed, the fifth transport mode subroutine is executed in step S614, then the program continues to step S617. In the fifth transport mode subroutine, a single aperture card ap in the discharge tray 123 is transported to the carrier.

On the other hand, when the fifth transport mode key 205 has not been pressed, a check is run in step S615 to determine whether or not the sixth transport mode key 206 has been depressed. If the sixth transport mode key 206 has been pressed the sixth transport mode subroutine is executed in step S616, and the program returns to step S617. The sixth transport mode subroutine transports the aperture card ap from the carrier to the reserve tray 124, and is used, for example, when a single aperture card ap is examined so as to discriminate between a necessary card and an unnecessary card. When the examined card is necessary, the necessary card can be accommodated in the reserve tray 124 by pressing the sixth transport mode key 206.

Figure 11:
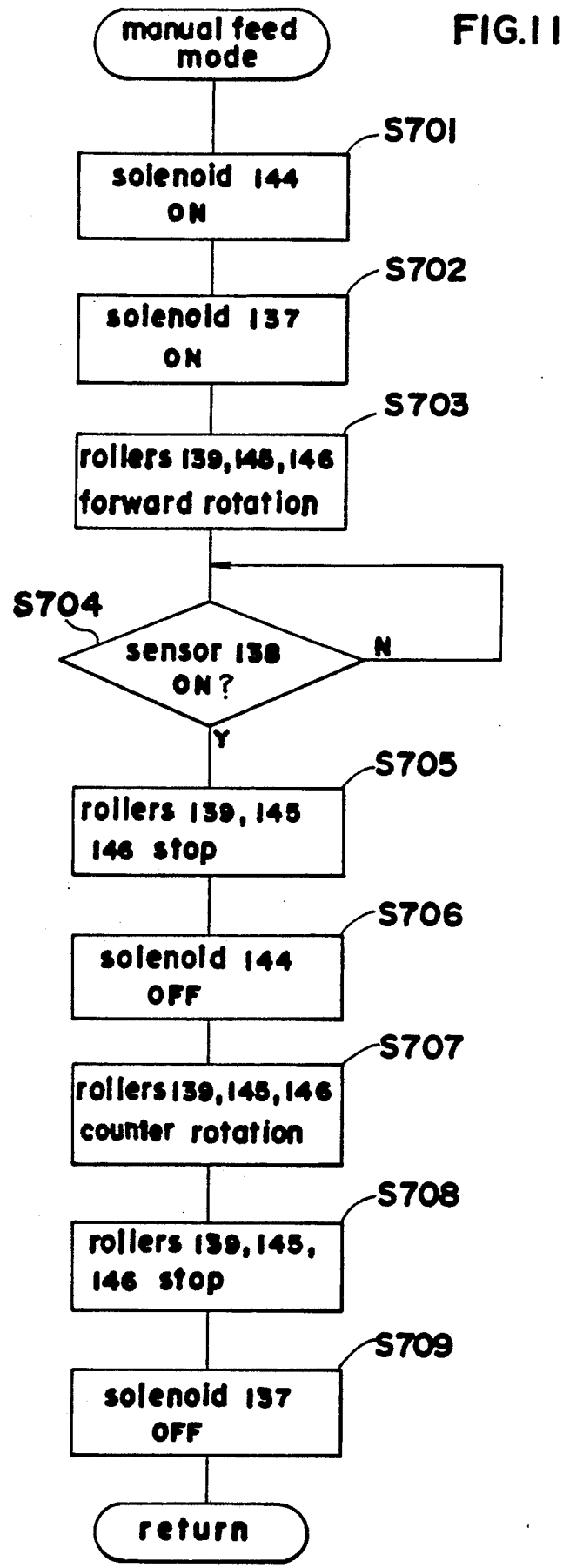

The operation sequence of the manual feed mode subroutine previously mentioned in step S603 is described hereinafter with reference to FIG. 11.

When sensor 147 detects the insertion of an aperture card ap into the manual feed portion 121, the solenoid 144 switches ON with the first transport means 131 is in the state of delivering an aperture card ap to the carrier (step S701). The result of solenoid 144 switching ON is that the card stopper 143 is retracted from the main transport path 133. Subsequently, in step S702, the solenoid 137 is switched ON, and the two glass plates 111 are separated.

Then, in step S703, the transport rollers 139, 146 and 145 are simultaneously forward rotated (rotated in the clockwise direction in FIG. 7), and the aperture card ap held between the two glass plates 111 is discharged therefrom to the discharge tray 123. At the same time, the aperture card ap inserted into the manual feed portion 121 is transported into the main transport path 133.

The aperture card ap is transported into the main transport path 133 until it reaches the position of the sensor 138, and when the sensor 138 detects the aperture card ap (step S704) the forward rotation of the aforesaid transport rollers 139, 145 and 146 is stopped after a specified time period has elapsed (step S705). After the sensor 138 detects the present of the aperture card ap, the transport rollers are stopped and maintained on standby for a specified time period so the aperture card ap can completely pass by the position of the card stopper 143.

Then, the solenoid 144 is switched OFF, and the card stopper 143 is interposed into the main transport path 133 (step S706).

Next, in step S707, the previously mentioned transport rollers 139, 145 and 146 are counter-rotated (counterclockwise direction in FIG. 7), and the aperture card ap is transported so as to make contact with the card stopper 143, whereupon the drive force for counter-rotation of the transport rollers 139, 145 and 146 is stopped in step S708. That is, the aperture card ap is positioned at the projection position.

The aperture card ap is held between the two glass plates 111 when the solenoid 137 is switched OFF (step S709). Thereafter, the microfilm image of the aperture card ap is projected onto the screen 102 and printed.

Figure 12:
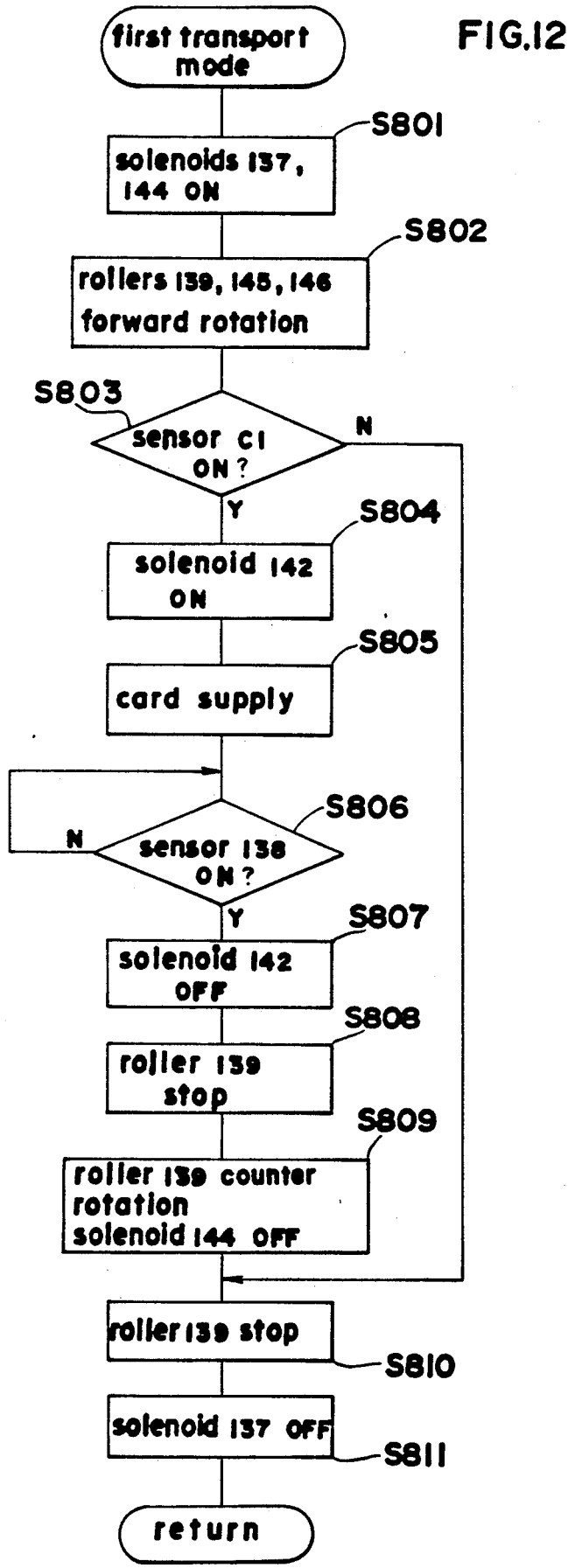

The operation sequence for the execution of the step 605 in the previously mentioned first transport mode subroutine is described with reference to FIG. 12.

First, in step S801, the solenoid 144 switches ON with the aperture card ap in the state shown in FIG. 7, so that the card stopper 143 is retracted from the main transport path 133, while at the same time the solenoid 137 switches ON and the two glass plates 111 are separated.

In step S802 the transport rollers 139, 145 and 146 are forward rotated (clockwise direction in FIG. 7). The result of the aforesaid forward rotation of the transport rollers 139, 145 and 146 is that the aperture card ap held between the two glass plates 111 is discharged to the discharge tray 123.

Next, a check is run in step S803 to detect whether or not the sensor C1 is ON, and to determine if an aperture card ap remains in the card stocker unit 122. If the result of the query in step S803 is negative, i.e., if an aperture card ap does not remain in the card stocker unit 122 (sensor C1 is OFF), the program continues to step S810.

On the other hand, if an aperture card ap does remain in the card stocker unit 122 (reply to query in step S803 is YES), the solenoid 142 is switched ON in step S804. When the solenoid 142 is switched ON, the driven roller 140 is separated from the transport roller 139 via the arm 141 so as to allow the aperture card ap to be transported upward between the rollers 139 and 140.

Then, the aperture card ap is transported from the card stocker unit 122, for example, to the main transport path 133 through the transport path 334 (FIG. 6) by the first transport means 131 (step S805).

Thereafter, in step S806, the aforesaid transport of the aperture card ap is detected and after a specified time period has elapsed, the solenoid 142 is switched OFF and the roller 140 makes contact with the roller 139 in step S807.

Next, in step S808, the transport roller 139 is stopped after a specified timer period has elapsed. The transported aperture card ap is thereby delivered to a specified position at the right side in FIG. 7 so as to enter the main transport path 133.

Subsequently, in step S809, the solenoid 144 is switched OFF and the aperture card ap is inserted into the main transport path 133 the transport roller 139 is counter-rotated (counterclockwise direction in FIG. 7), and the aperture card ap comes into contact with the card stopper 143. Then, the drive force to the transport roller 139 is stopped in step S810. That is, the aperture card ap is positioned at the projection position.

In step S811, the solenoid is switched OFF, and the aperture card ap is held between the two glass plates 111. The microfilm image of the aperture card ap is projected onto the screen 102 and printed.

Figure 13:
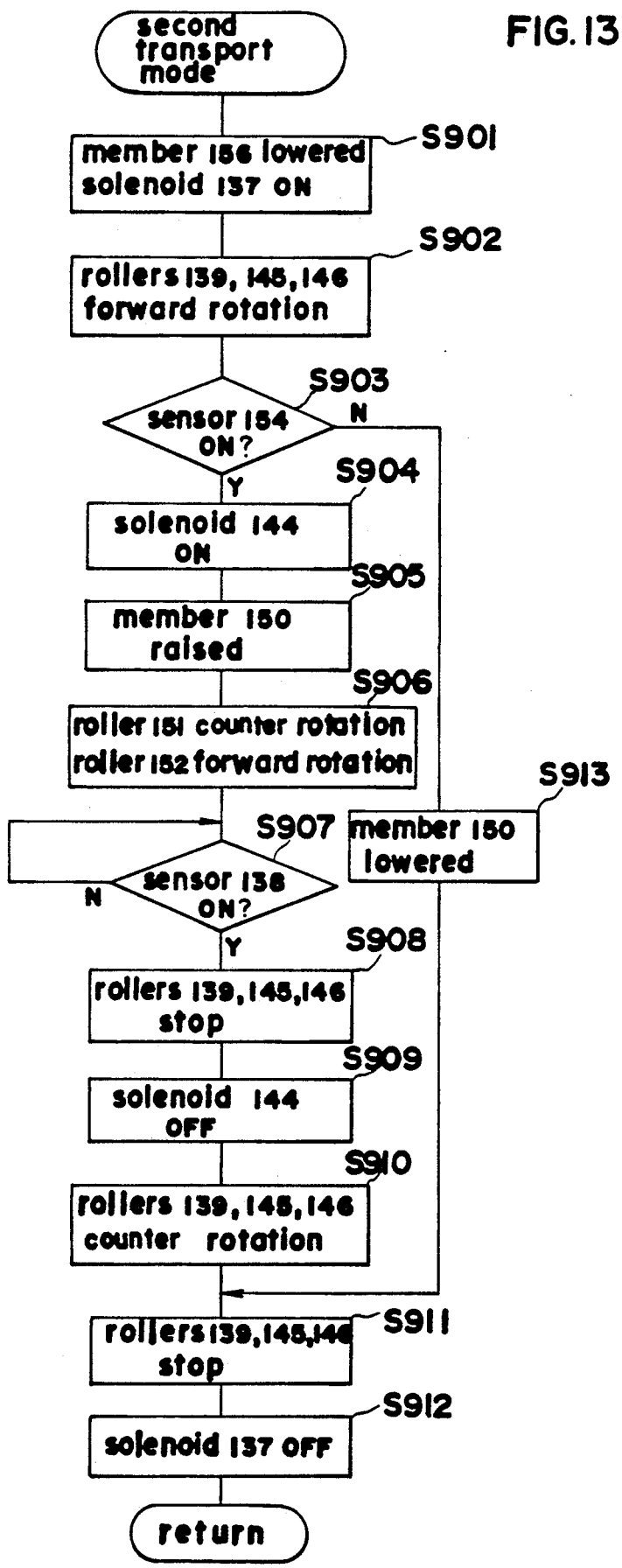

The operation sequence of the second transport mode subroutine executed in the previously described step S607 is described hereinafter with reference to FIG. 13.

In step S901, the lift-up member 156 of the discharge tray 123 is lowered (opening the access to tray 123). The aforesaid action sets the condition for accommodating the aperture card ap in the discharge tray 123. Then, the two glass plates 111 are separated by switching ON the solenoid 137.

Thereafter, the transport rollers 139, 145 and 146 are forward rotated (clockwise direction in FIG. 7), and the aperture card ap held between the two glass plates 111 is discharged to the discharge tray 123 (step S902).

A check is made in step S903 to determine whether or not the sensor 154 provided in the reserve tray 124 has detected the presence of an aperture card ap in the reserve tray 124. If the results of the check indicate an aperture card ap is not present in the reserve tray 124 (reply to query in step S903 is NO), the lift-up member 150 of the reserve tray 124 is lowered (step S913), and the program continues to step S911.

On the other hand, if an aperture card ap is present in the reserve tray 124 (reply to query in step S903 is YES), first, the solenoid 144 is switched ON in step S904. Then, the card stopper 144 is retracted from the main transport path 133.

Next, the lift-up member 150 of the reserve tray 124 is raised (step S905). The result of this action is that one end of the aperture card ap accommodated in the reserve tray 124 comes into contact with the pickup roller 151 and the aperture card ap discharge preparation is completed.

In step S906, the pickup roller 151 is counter-rotated, the transport roller 152 is forward rotated, and the aperture card ap is transported into the main transport path 133.

The aperture card ap is advanced to the position of the sensor 138 whereupon the card is detected by the sensor 138 in step S907, then the forward rotation of the transport rollers 139, 145 and 146 is stopped after a specified timer period has elapsed (step S908). After the sensor 138 has detected the aperture card ap, the rollers are stopped for a specified period to assure that the aperture card ap has completely the position of the card stopper 143.

Then, in step S909, the solenoid 144 is switched OFF and the card stopper 143 is interposed into the main transport path 133.

The transport rollers 139, 145 and 146 are counter-rotated and the aperture card ap is brought into contact with the card stopper 143 (step S910).

The rotation of the transport rollers 139, 145 and 146 is stopped in step S911.

Thereafter, in step S912, the solenoid 137 is switched OFF and the aperture card ap is held between the two glass plates 111. The microfilm image of the thus held aperture card ap is projected onto the screen 102 and printed.

Figure 14:
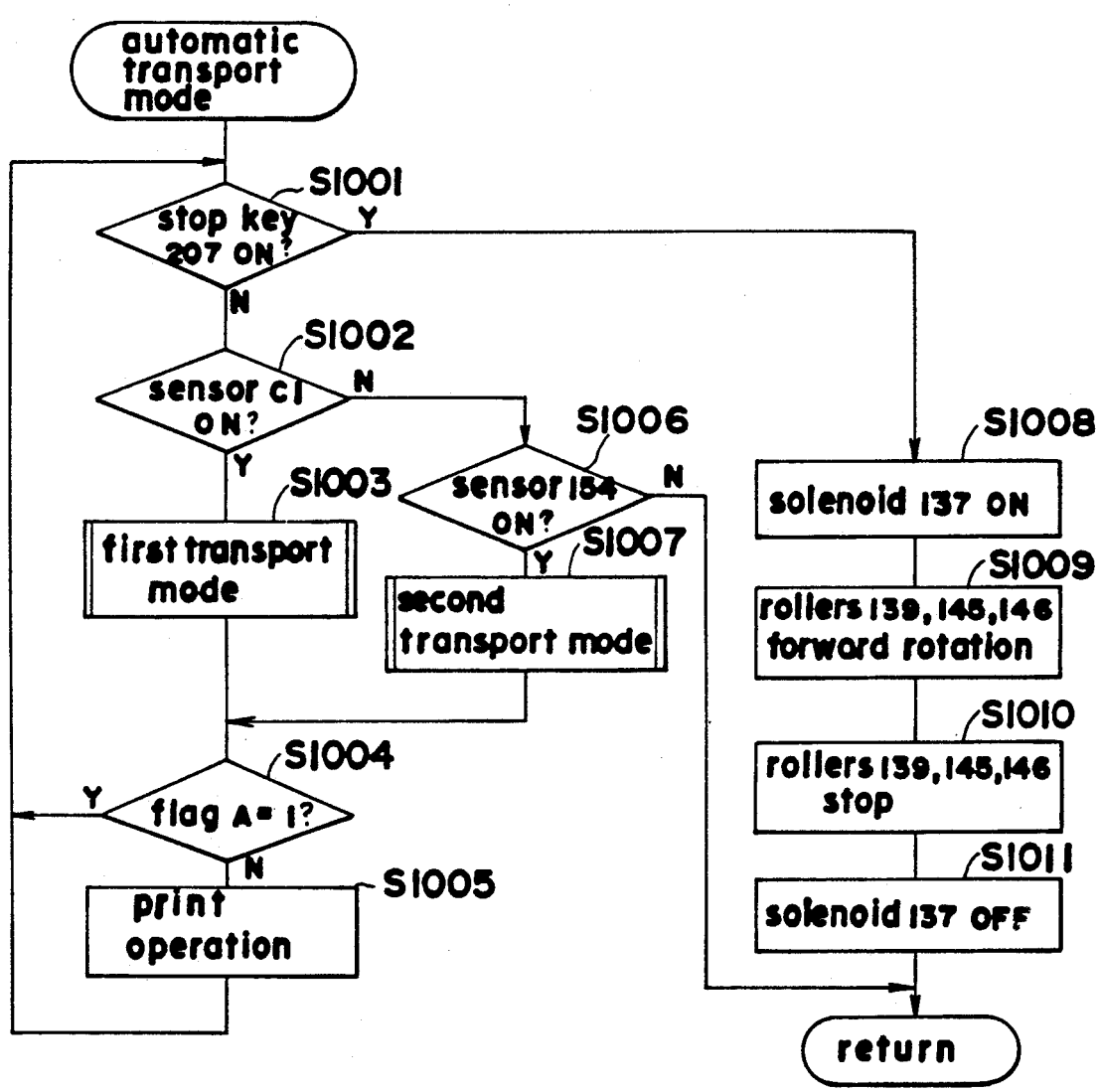

The operation sequence of the automatic transport mode subroutine executed in step S610 is described hereinafter with reference to FIG. 14.

First, a check is made in step S1001 to determine whether or not the stop key 207 has been pressed.

If the stop key 207 has not been pressed (reply to query in step S1001 is NO), a check is subsequently made in step S1002 to determine whether or not the sensor C1 of the card stocker unit 122 is switched ON to determine whether or not an aperture card ap is loaded in the card stocker unit 122.

When an aperture card ap is found to be loaded in the card stocker unit 122 (reply to query in step S1002 is YES), the first transport mode is executed in step S1003, then a check is made in step S1004 to determine whether or not the print operation flag A is set at [1] in step S1004. That is, a determination is made as to whether or not to execute a print operation.

When a print operation has not been specified (reply to query in step S1004 is YES), the routine is again executed from step S1001. On the other hand, if a print operation has been specified (reply to query in step S1004 is NO), the print operation is executed in step S1005, and thereafter the routine is executed again from step S1001. When the results of the check made in step S1002 specify that an aperture card ap is not loaded in the card stocker 122 (reply to query in step S1002 is NO), a check is made in step S1006 to determine whether or not the sensor 154 of the reserve tray 124 is switched ON so as to confirm that a card is loaded in the reserve tray 124.

When an aperture card ap is present in the reserve tray 124 (reply to query in step S1006 is YES), the second transport mode subroutine is executed in step S1007, and thereafter the program continues to step S1004. The steps S1002 and S1006 define the priority of the transport of the aperture card ap from the card stocker unit 122.

On the other hand, when the result of the check made in step S1006 indicates an aperture card ap is not loaded in the card stocker unit 122 (reply to query in step S1006 is NO), the program returns to the main program.

When the result of the check made in step S1001 indicates that the stop key 207 has been pressed (reply to query in step S1001 is YES), the solenoid 137 is switched ON to separate the two glass plates 111 (step S1008).

Thereafter, the transport rollers 139, 145 and 146 are forward rotated (clockwise direction in FIG. 7) in step S1009 to discharge the aperture card ap held between the two glass plates 111 into the discharge tray 123.

Subsequently, the drive force to the transport rollers 139, 145 and 146 is stopped in step S1010. Then, in step S1011, the solenoid 137 is switched OFF to return the two glass plates 111 to their initial state. The routine then returns to the main program.

Figure 15:
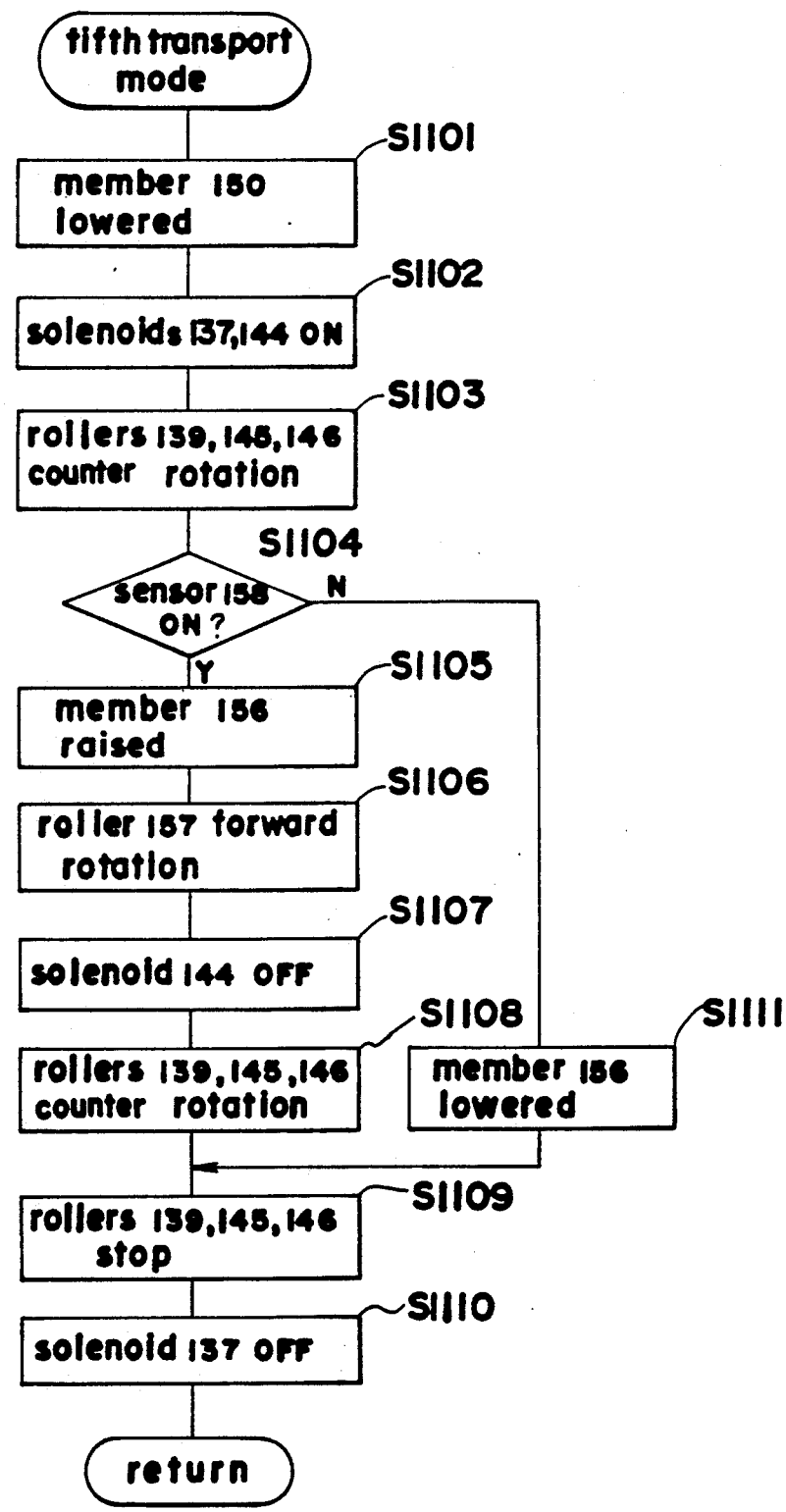

The operation sequence of the fifth transport mode subroutine executed in the previously described step S614 is described hereinafter with reference to FIG. 15.

First, in step S1101, the lift-up member 150 of the reserve tray 124 is lowered, so the aperture card ap can be accommodated in the reserve tray 124. Thereafter, in step S1102, the solenoid 144 is switched ON to retract the card stopper 143 from the main transport path 133, and at the same time the solenoid 137 is switched ON to separate the two glass plates 111.

In step S1103, the transport rollers 139, 145 and 146 are counter-rotated (counterclockwise direction in FIG. 7) to discharge the aperture card ap held between the two glass plates 111 into the reserve tray 124.

The sensor 158 of the discharge tray 123 is then checked in step S1104 to determine whether or not an aperture card ap is present in the discharge tray 123. If an aperture card ap is not present in the discharge tray 123 (reply to query in step S1104 is NO), the lift-up member 156 of the discharge tray 123 is lowered in step S1111, and the routine continues to step S1109 because there is no aperture card ap to be transported.

On the other hand, when an aperture card ap is present in the discharge tray 123 (reply to query in step S1104 is YES), the lift-up member 156 of the discharge tray 123 is first raised in step S1105, such that one end of the aperture card ap makes contact with the pickup roller 157.

In step S1106, the pickup roller 157 is forward rotated so as to transport the aperture card ap into the main transport path 133. Thereafter, in step S1107, the solenoid 144 is switched OFF to interpose the card stopper 143 into the main transport path 133.

In step S1108, the transport rollers 139, 145 and 146 are counter-rotated (counterclockwise in FIG. 7), and the aperture card ap discharged from the discharge tray 123 is advanced to the position of the card stopper 143, whereupon the drive force to the transport rollers 139, 145 and 146 is stopped in step S1109.

In step S1110, the solenoid 137 is switched OFF. This action results in the aperture card ap being held between the two glass plates 111, the microfilm image is then projected onto the screen 102 and printed. The card from the discharge tray 123 is then returned to the carrier.

The aforesaid aperture card ap may again be discharged to the discharge tray 123, or transported to the reserve tray 124 and reserved therein.

Figure 16:
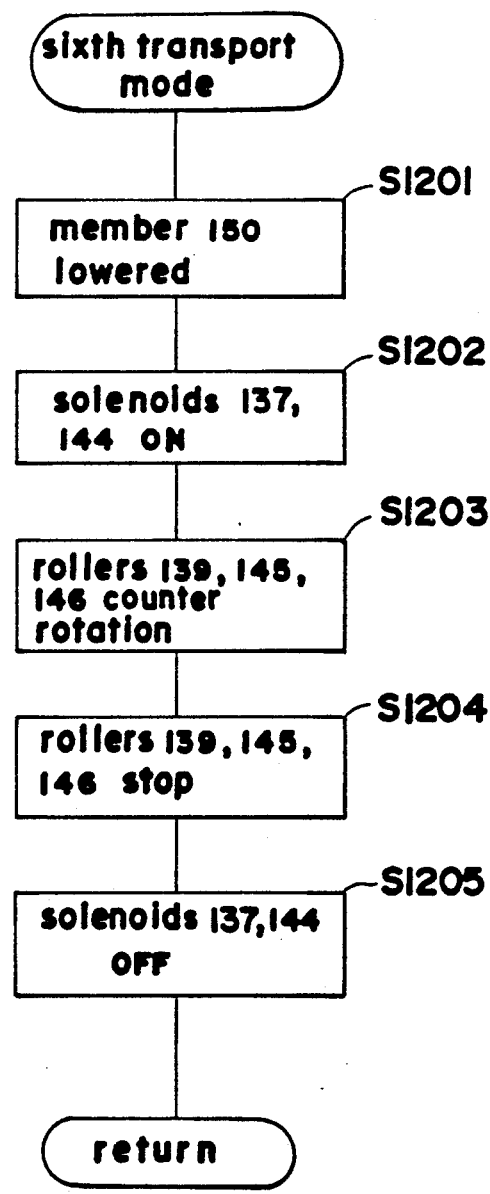

The operation sequence of the sixth transport mode subroutine executed in step S616 is described hereinafter with reference to FIG. 16.

First, in step S1201, the lift-up member 150 of the reserve tray 124 is lowered to enable the accommodation of an aperture card ap in the reserve tray 124. Then, the solenoids 137 and 144 are switched ON in step S1202.

The aforesaid action results in the card stopper 143 being retracted form the main transport path 133, while at the same time the two glass plates 111 are separated. In step S1203, the transport rollers 139, 145 and 146 are counter-rotated (counterclockwise direction in FIG. 7), and the aperture card ap held in the carrier is discharged to the reserve tray 124. At this time, the guide member 153 precisely guides the aperture card ap to the reserve tray path 136.

Thereafter, in step S1204, the rotation of the transport rollers 139, 145 and 146 is stopped. Then, the solenoids 137 and 144 are switched OFF in step S1205, and the routine returns to the main program.

As previously described, the present embodiment provides a first card transport means 131 for sequentially transporting a plurality of aperture cards ap to a carrier (two glass plates 111), and separately provides a second card transport means 132 for delivering an aperture card ap from the manual feed portion 121 to the carrier, a third card transport means 160 for transporting an aperture card ap from the reserve tray 124 to the carrier and from the carrier to the reserve tray 124, and a fourth card transport means 161 for transporting an aperture card ap from the discharge try 123 to the carrier and from the carrier to the discharge try 123.

Further, two card trays on the left and right sides are provided and capable of accommodating and discharging the aperture cards ap. Accordingly, the paths for transporting the aperture cards ap to the projection position include the first path from the card stocker unit 122 through the transport path 334, a second path from the manual feed path 134 to the main transport path 133, a third path from the reserve tray path 136 to the main transport path 133, and a fourth path from the discharge tray path 135 to the main transport path 133.

In addition, the aperture card ap can be discharged from the projection position 111 by two paths to the reserved tray 123 and the discharge tray 124.

The present embodiment allows a desired method of use to be selected via the previously described combination of transport and discharge paths. For example, examination, selection, reserve, discharge, re-supply, and sorting of card can be readily and simply accomplished.

The reader-printer of the present embodiment provides a marked improvement in handling and operation.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A transport device provided in an apparatus which is capable of projecting on a screen an image of an original at a projecting position and printing the projected image on a recording medium if necessary, said transport device comprising:
    an accommodating portion for accommodating a plurality of the originals;
    an insertion portion through which one original is inserted in the transport device;
    first transport means for transporting one after another to said projecting position the originals accommodated in said accommodating portion; and
    second transport means for transporting to the projecting position the one original inserted through said insertion portion.

2. A transport device as claimed in claim 1 wherein one original is manually inserted into the insertion portion.

3. An apparatus for visualizing an image of an original comprising:
    a visualizing position wherein the image of the original is visualized;
    an accommodating portion for accommodating a plurality of originals;
    first transport means for transporting, one after another, to said visualizing position the originals accommodated in said accommodating portion;
    an insertion portion through which one original is inserted into the apparatus; and
    second transport means for transporting to the visualizing position the one original inserted through said insertion portion.

4. A transport device provided in an apparatus which is capable of projecting on a screen an image of an original at a projecting position and printing the projected image on a recording medium if necessary, said transport device comprising:
    a supply portion from which the original is supplied to said projecting position;
    a discharge portion to which the original is discharged;
    first transport means for transporting to the projecting position the original supplied from said supplying portion;
    second transport means for transporting the original from the projecting position to the discharge portion; and
    third transport means for transporting the original from the discharge portion to the projecting position.

5. An apparatus for visualizing an image of an original comprising:
    a visualizing position wherein the image of the original is visualized;
    a supply portion from which the original is supplied to said visualizing position;
    a discharge portion to which the original is discharged;
    first supply means for supplying the original from said supply portion to said visualizing position;
    discharge means for discharging the original from the visualizing position to the discharge portion; and
    second supply means for supplying the original from the discharge portion to the visualizing position.

6. A transport device provided in an apparatus which is capable of projecting on a screen an image of an original at a projecting position and printing the projected image on a recording medium if necessary, said transport device comprising:
    supply means for supplying the original to said projecting position;
    first and second discharge portions to which the original is discharged;
    first transport means for transporting the original from the projecting position to the first discharge portion; and
    second transport means for transporting the original from the projecting position to the second discharge portion.

7. An apparatus for visualizing an image of an original comprising:
    a visualizing position wherein the image of the original is visualized;
    supply means for supplying the original to said visualizing position;
    first and second discharge portions to which the original is discharged;
    first transport means for transporting the original from the projecting position to the first discharge portion; and
    second transport means for transporting the original from the projecting position to the second discharge portion.

* * * * *